United States Patent
Norrga et al.

(10) Patent No.: US 9,276,407 B2
(45) Date of Patent: Mar. 1, 2016

(54) POWER SYSTEM AND METHOD OF OPERATING A POWER SYSTEM

(75) Inventors: Staffan Norrga, Stockholm (SE); Antonis Marinopoulos, Västerås (SE); Konstantinos Papastergiou, Geneva (CH); Panagiotis Bakas, Västerås (SE)

(73) Assignee: ABB RESEARCH LTD, Zürich (CH)

( * ) Notice: Subject to any disclaimer, the term of this patent is extended or adjusted under 35 U.S.C. 154(b) by 0 days.

(21) Appl. No.: 14/398,930

(22) PCT Filed: Jun. 5, 2012

(86) PCT No.: PCT/EP2012/060614
§ 371 (c)(1),
(2), (4) Date: Dec. 17, 2014

(87) PCT Pub. No.: WO2013/182230
PCT Pub. Date: Dec. 12, 2013

(65) Prior Publication Data
US 2015/0115721 A1 Apr. 30, 2015

(51) Int. Cl.
*H02J 3/38* (2006.01)
*H02J 1/12* (2006.01)
*H02M 1/12* (2006.01)
*H02M 7/42* (2006.01)
*H02J 3/00* (2006.01)

(52) U.S. Cl.
CPC ... *H02J 3/38* (2013.01); *H02J 1/12* (2013.01); *H02M 1/12* (2013.01); *H02M 7/42* (2013.01); *Y10T 307/707* (2015.04); *Y10T 307/718* (2015.04)

(58) Field of Classification Search
CPC .......................................................... H02J 3/00
USPC .......................................................... 307/43
See application file for complete search history.

(56) References Cited

U.S. PATENT DOCUMENTS

| 8,053,930 B2 | 11/2011 | Cramer et al. |
| 8,310,094 B2 | 11/2012 | Yamada et al. |
| 2010/0208501 A1 | 8/2010 | Matan et al. |

(Continued)

FOREIGN PATENT DOCUMENTS

| CN | 201869128 U | 6/2011 |
| CN | 10216852 A | 8/2011 |
| CN | 102388622 A | 3/2012 |

(Continued)

OTHER PUBLICATIONS

Meng et al., "Characteristics and Application of VSC-HVDC Power Transmission System," Journal of Shenyang Institute of Engineering (Natural Science), vol. 8, No. 2, Apr. 2012, pp. 143-147.

*Primary Examiner* — Robert Deberadinis
(74) *Attorney, Agent, or Firm* — Birch, Stewart, Kolasch & Birch, LLP

(57) ABSTRACT

A power system includes a power generating plant including a plurality of power generators, and an AC collection grid adapted to interconnect the power generating plant and an HVDC converter station. The AC collection grid is adapted to operate outside network regulations, whereby advantages such as simplified control and electronics are achieved. A method of operating a power system is also provided.

20 Claims, 1 Drawing Sheet

(56) References Cited

U.S. PATENT DOCUMENTS

2012/0205981 A1* 8/2012 Varma et al. .................. 307/64
2013/0274946 A1* 10/2013 Schelenz et al. ............. 700/297

FOREIGN PATENT DOCUMENTS

FR            2 940 865 A1    7/2010
WO   WO 2007/086472 A1    8/2007

* cited by examiner

POWER SYSTEM AND METHOD OF OPERATING A POWER SYSTEM

TECHNICAL FIELD

The present invention relates generally to a power system and more particularly to a power system comprising a plurality of power generators connected to an HVDC converter station. The present invention also relates to a method of operating such a power system.

BACKGROUND ART

Photovoltaic (PV) energy generation systems are attractive from the point of view in that they offer a way of generating electricity without $CO_2$ emissions and other drawbacks of conventional energy sources. However, they suffer from the drawback that the best sites for generation are geographically located around the tropics, far from major load centers. For this reason long-distance power transmissions are likely to be necessary if photovoltaics should be employed on a large scale.

For very long distances and subsea transmission the preferred method is currently high voltage direct current (HVDC) transmission. The most intuitive way of creating a PV power plant with HVDC connection is shown in FIG. 1. The plant comprises a large number of PV panels connected in series and parallel to form arrays. These arrays are connected to inverters which convert the unregulated DC output from the PV panels into a regulated AC voltage and ensure that the PV arrays operate in their maximum power point. The inverters feed power into an MV AC collection grid via transformers. The collection grid is connected to a current source converter HVDC converter station, which requires large filters and capacitor banks for compensating the harmonic currents and the reactive power demand associated with the thyristor converter. Also startup of the system provides a technical challenge since there is no large voltage source present in the collection grid, such as a synchronous generator, that can allow for the energizing of the collection grid. One way of mitigating this problem is to provide a STATCOM or a Diesel Gen-set unit in the collection grid. This however, implies cost and power losses that should preferably be avoided.

SUMMARY OF INVENTION

An object of the present invention is to eliminate or at least mitigate the problems of prior art and to provide a power system which simpler and easier to control as compared to prior art power systems.

The invention is based on the insight that a power system comprising a private-owned power collection system can operate differently from power systems governed by regulations, such as IEEE 1547.

According to a first aspect of the present invention a power system is provided, comprising a power generating plant comprising a plurality of power generators, and an AC collection grid adapted to interconnect the power generating plant and an HVDC converter station, the system being characterized in that the AC collection grid is adapted to operate outside network regulations.

In a preferred embodiment, the power generators comprise photovoltaic arrays.

In a preferred embodiment, the inverters are adapted to provide part of, and preferably all of harmonics filtering. In this way, the requirements on the AC collection grid and the HVDC station are lowered.

According to a second aspect of the present invention, a method of operating a power system according to claim 1 is provided, comprising the steps of performing a start-up by a step-by-step approach, and operating the AC collection grid (200) outside network regulations.

Additional preferred embodiments are defined by the dependent claims.

BRIEF DESCRIPTION OF DRAWINGS

The invention is now described, by way of example, with reference to the accompanying drawings, in which.

DESCRIPTION OF EMBODIMENTS

In the following, a detailed description of a power system and a method of operating such a system will be given.

Figure 1:
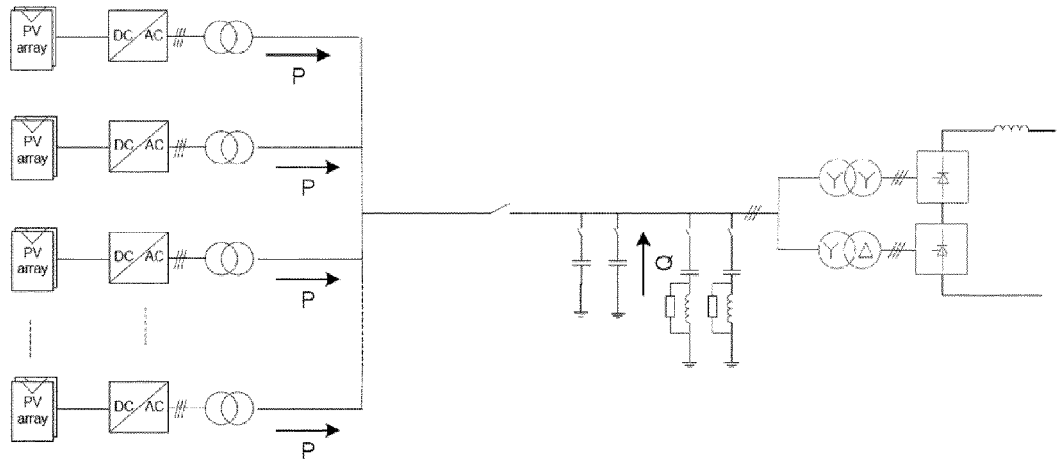
FIG. 1 is a schematic of a power system according to prior art.

FIG. 1 has been described in the background art section and will not be further commented herein.

Figure 2:
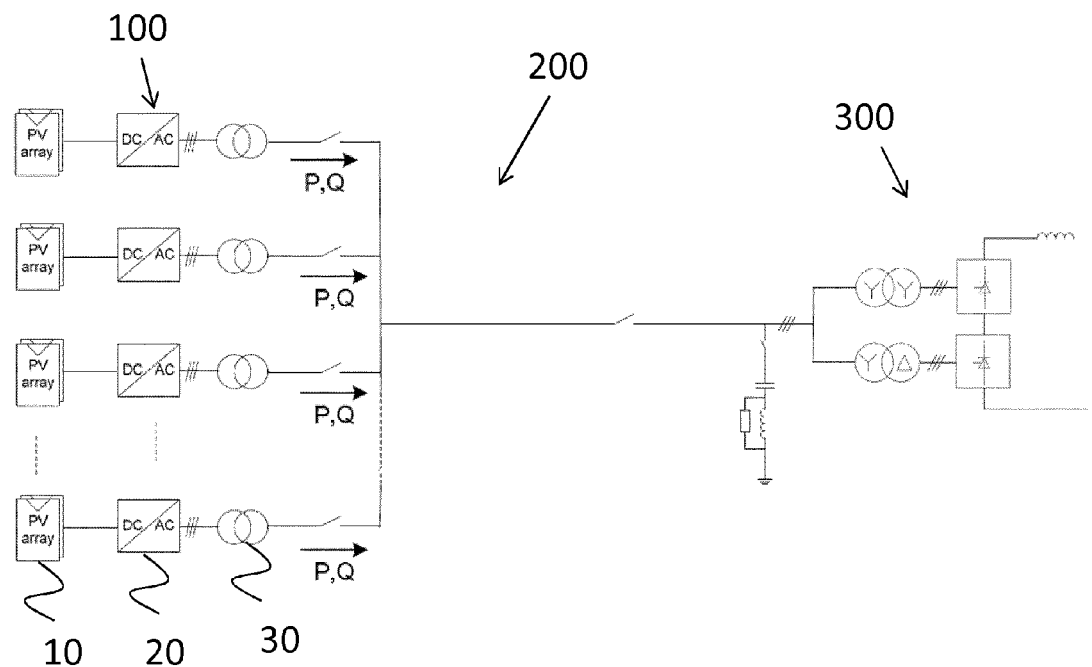
FIG. 2 is a schematic of a power system according to the present invention.

With reference to FIG. 2, a power system comprises a power generating plant, generally designated 100, having a plurality of power generators 10 and a plurality of inverters 20, wherein each inverter is connected to a respective power generator. In large scale power generating plants, there can be from 100 inverters up to as many as 1000 inverters or even more. Thus, the power generating plant 100 is a microgrid with a localized grouping of electricity generation.

In a preferred embodiment, the power generators are comprised in a large photovoltaic power station and each power generator 10 is a photovoltaic (PV) array. A photovoltaic power station, also known as a solar park or solar farm, is a large-scale photovoltaic system designed for the supply of power into the electricity grid. They are differentiated from most building mounted and other decentralized solar power applications because they supply power at the utility level, rather than to a local user or users.

The power generating plant 100 is connectable to a public power network by means of an HVDC converter station, generally designated 300, via an AC collection grid, generally designated 200. The HVDC converter station 300 could be with HVDC connection using thyristor-based line-commutated converters. Current source converter based HVDC with its low cost and low losses can be used for an application where it would otherwise not be possible.

Power flow is always unidirectional which means that the voltage polarity on the DC side will be constant, implying that extruded cross-linked polymer cables can be used for the DC transmission.

The amount of filtering in the HVDC station can be reduced in correspondence with the active filtering provided by the inverters and the reduced harmonic requirements on the collection grid. In a preferred embodiment, the inverters 20 are adapted to provide part of, and preferably all of harmonics filtering, whereby filtering in the HVDC station is further reduced. This can preferably be according to the standard IEC 61000-1-14.

The AC collection grid 200 is adapted to interconnect the power generating plant 100 and the HVDC converter station 300. The collection grid is basically a private-owned power collection system and the only interface with the public transmission grid is the HVDC converter station 300. Therefore, inside the collection grid 200 the usual restrictions regarding power quality in the public grid are not applied. In that sense the limitations for voltage drop and/or total harmonic distortion, etc. will depend on technical limitations of the components only, and will not have to comply with any strict regulations, such as IEEE 1547, thus leading to possibly less costly components and simpler control.

Due to the nature of solar energy, the PV power plant 100 has to startup at least once a day, i.e., during sunrise. As the PV plant 100 comprises numerous PV inverters 20, these can be used to energize the collection grid before connecting to the transmission system. The PV inverters 20 have voltage and frequency control based on droops controlling reactive and active power, respectively (V-Q) and (P-f).

For the coordinated control of all PV inverters 20, a central controller (not shown) is located at the low voltage (LV) side of the HVDC converter station at a secondary control level.

Distributed controllers are also provided which will locally control the PV inverters 20 at a primary control level. A communication infrastructure is provided to guarantee information exchange between the controllers.

The central controller is basically needed when the collection grid has been energized and synchronized. Its role is to ensure that there is absolute synchronization in terms of voltage and frequency before the collection grid is connected to the electricity grid. Also, while in operation if a case occurs that the frequency in the grid side increases above a predefined level, the central controller should pass a frequency signal to the local distributed controllers so that they decrease their power output to keep the frequency inside the limits.

In a preferred embodiment, the PV inverters 20 energize the collection grid 200 at startup by a step-by-step approach.

The capability of the PV inverters to control active and reactive power independently is used in order to let the inverters collectively perform voltage regulation on the collection grid and provide the reactive power consumed by the HVDC converter station. In a preferred embodiment, a droop control function is used. This means that reactive power vs. voltage is applied to each of the inverters. Also, during startup the inverters can be used to energize the collection grid. This can be done in such fashion that the inverters are activated and connected to the grid one by one or alternatively one group after another.

The PV inverters are adapted to contribute to part or all of the harmonic filtering and are immune to the remaining harmonics on the collection grid.

The PV inverters can provide part or all of the reactive power required by the HVDC station in operation.

An example of operation of the above described power system will now be described, particularly with reference to the start-up, energizing procedure, which in the preferred embodiment is performed by a step-by-step approach. With the first sunlight one PV inverter 20 of a subset of the total PV array will start operating with Voltage Source Inverter (VSI) control logic. Thus the inverters will feed the collection grid 200 with pre-defined values of voltage, magnitude and phase, and frequency. The active and reactive power will depend on the load, which in this connection is the cabling of the collection grid and/or any controllable loads or energy storage, see below. Later, a second PV inverter of the same subset can start operating also as VSI, sharing the power with the first one. Before the second inverter can connect the local controller has to ensure that the voltage magnitude and phase are as close as possible with the values of the first inverter, so as to avoid excessive currents. This can continue with all the PV inverters 20 of the subset working as VSI in parallel. In that case the inverters are coupled via the inductances resulting from cabling and/or filters. This scheme, wherein more than one inverter can act as VSI is a so-called multi master operation.

Another option is a so-called single master operation, wherein a single PV inverter 20 in one subset can act as a master and all the others can operate in PQ mode, providing active and reactive power based on a set point by the local or central controller. In that later case the inverters should be absolutely synchronized. In this second option it is preferred to have a storage device, as only one inverter will have to play the master role.

When all the PV inverters 20 of all the subsets are operating, the subsets can be interconnected to form the total collection grid of the PV plant. Each subset can be considered as a small island. The synchronization conditions (phase sequence, voltage and frequency) will be verified by the local controllers.

When all PV inverters are working synchronized and the collection grid is energized, the HVDC station will connect the whole PV power plant to the transmission grid and can take over the frequency control. The synchronization conditions should be verified by the central controller. In the case that the HVDC controller will take the control from the local inverters, it will have a predefined power and will send signals to the local controllers. In case the local controllers apply MPPT (Maximum Power Point Tracking) then those will be the ones to send the power reference to the HVDC controller, which will then provide as much power as the summation of the individual inverters.

The energizing procedure can be assisted in case the PV power plant includes some kind of energy storage and/or controllable loads. In that case secondary controllers should also be considered for these components. In a preferred embodiment, the power system comprises energy storage devices. These energy storage devices, such as batteries, fuel cells, flywheels etc., can help during the startup by energizing the cables and/or the transformers. The controllable loads can help with the frequency control (P-f droop).

In the preferred embodiment described above, the active power flow will be unidirectional. In other words, since there is no consumption of active power in the power generating plant 100 and the AC collection grid, the active power will flow only in the direction from the power generating plant 100 and to the HVDC converter station 300. This in turn means that the voltage at the HVDC converter station 300 will be unipolar.

Preferred embodiments of a power system and a method of operating a power system have been described. It will be realized that these can be varied within the scope of the appended claims without departing from the inventive idea.

In the described embodiments, all power generators have been described as PV arrays connected to an inverter. It will be appreciated that the inventive idea is applicable also to other kinds of power sources, such as DC generators. Alternatively, the PV arrays are replaced with or supplemented with wind generators.

The invention claimed is:

1. A power system comprising:
   a power generating plant comprising a plurality of power generators; and
   an AC collection grid adapted to interconnect the power generating plant and an HVDC converter station,
   wherein the AC collection grid is adapted to operate outside network regulations.

2. The power system according to claim 1, wherein each power generator is a photovoltaic array.

3. The power system according to claim 2, wherein the AC collection grid is adapted to connect to current source converter based HVDC.

4. The power system according to claim 2, wherein the direct voltage at the HVDC converter station is unipolar.

5. The power system according to claim 2, wherein the power generating plant comprises a plurality of inverters, wherein each inverter is connected to a respective power generator.

6. The power system according to claim 2, wherein the regulations involve limitations for voltage drop and/or total harmonic distortion.

7. The power system according to claim 1, wherein the AC collection grid is adapted to connect to current source converter based HVDC.

8. The power system according to claim 7, wherein the direct voltage at the HVDC converter station is unipolar.

9. The power system according to claim 7, wherein the power generating plant comprises a plurality of inverters, wherein each inverter is connected to a respective power generator.

10. The power system according to claim 1, wherein the direct voltage at the HVDC converter station is unipolar.

11. The power system according to claim 10, wherein the power generating plant comprises a plurality of inverters, wherein each inverter is connected to a respective power generator.

12. The power system according to claim 1, wherein the power generating plant comprises a plurality of inverters, wherein each inverter is connected to a respective power generator.

13. The power system according to claim 12, wherein the inverters have voltage and frequency control based on droops controlling reactive and active power.

14. The power system according to claim 13, wherein the inverters are adapted to provide part of, and preferably all of harmonics filtering.

15. The power system according to claim 13, wherein the inverters are adapted to provide part of, and preferably all of the reactive power required by the HVDC converter station.

16. The power system according to claim 12, wherein the inverters are adapted to provide part of, and preferably all of harmonics filtering.

17. The power system according to claim 16, wherein the inverters are adapted to provide part of, and preferably all of the reactive power required by the HVDC converter station.

18. The power system according to claim 12, wherein the inverters are adapted to provide part of, and preferably all of the reactive power required by the HVDC converter station.

19. The power system according to claim 1, wherein the regulations involve limitations for voltage drop and/or total harmonic distortion.

20. A method of operating the power system according to claim 1, comprising the steps of:

performing a start-up by a step-by-step approach; and operating the AC collection grid outside network regulations.

* * * * *